Figure 1:
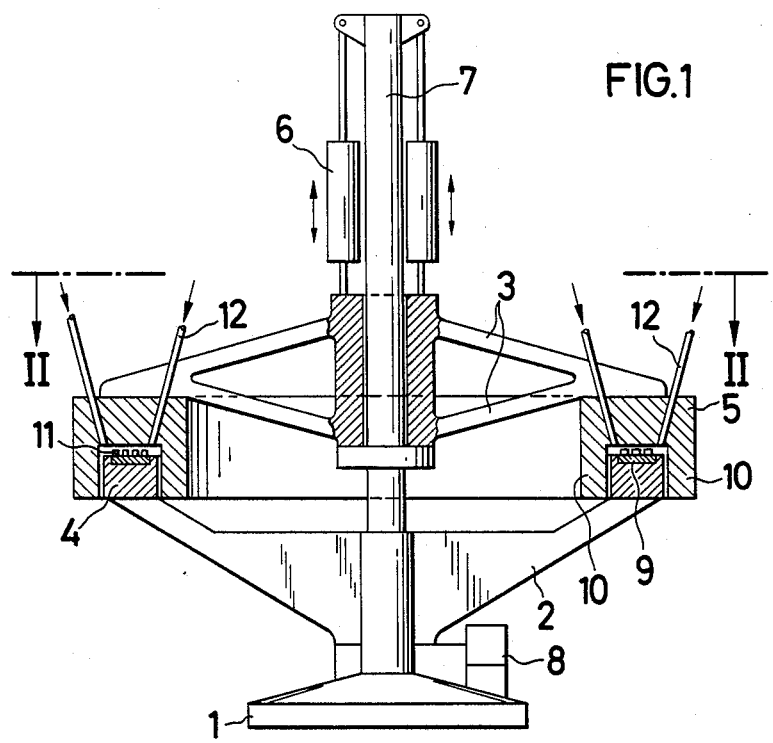

United States Patent [19]

Zeibig

[11] Patent Number: 4,832,887
[45] Date of Patent: May 23, 1989

[54] PROCESS FOR FIRING GREEN MOLDINGS OF CERAMIC PASTES

[75] Inventor: Anton Zeibig, Ottensoos, Fed. Rep. of Germany

[73] Assignee: Hoechst CeramTec Aktiengesellschaft, Selb, Fed. Rep. of Germany

[21] Appl. No.: 46,182

[22] Filed: May 5, 1987

[30] Foreign Application Priority Data

May 24, 1986 [DE] Fed. Rep. of Germany ....... 3617530

[51] Int. Cl.[4] .............................................. C04B 33/32
[52] U.S. Cl. ....................................... 264/57; 264/58; 264/63
[58] Field of Search .............................. 264/57, 58, 63

[56] References Cited

U.S. PATENT DOCUMENTS 1,605,818 11/1926 Duckham .............................. 264/58

OTHER PUBLICATIONS

Leaver et al., Ceramic Bulletin, vol. 51, No. 11, 1972, pp. 845–846.

*Primary Examiner*—James Derrington
*Attorney, Agent, or Firm*—Foley & Lardner, Schwartz, Jeffery, Schwaab, Mack, Blumenthal & Evans

[57] ABSTRACT

In the process for firing green moldings of ceramic pastes which contain plasticizers, the green moldings are placed on kiln furniture which has at least a temperature which corresponds to the decomposition temperature of the plasticizers. In addition, the kiln furniture and the green moldings are heated within 5 to 60 minutes to the firing temperature and kept there for 5 to 60 minutes. Cooling is then carried out to the original temperature within 5 to 60 minutes and the moldings are removed from the kiln furniture at this temperature. The invention achieves heating cycles of less than 3 hours.

5 Claims, 1 Drawing Sheet

U.S. Patent

May 23, 1989

4,832,887

PROCESS FOR FIRING GREEN MOLDINGS OF CERAMIC PASTES

The invention relates to a process for firing green moldings of ceramic pastes which contain plasticizers. It relates furthermore to an apparatus for firing the said moldings.

According to the known processes, the green moldings of ceramic pastes are deposited on so-called kiln furniture, e.g. firing plates, at room temperature, then heated to firing temperature, kept at said firing temperature for a certain time and then cooled to room temperature. The process time depends essentially on the thermal shock resistance of the kiln furniture. For high-temperature firing, in particular, e.g. of aluminum oxide parts, for which the firing temperatures are in the region of 1700° C., it is more than 24 hours even if moldings of less than 1 cm$^3$ are involved. Even though the firing temperatures are lower for parts made of silicate-ceramic materials or other materials, the situation in the case of the latter is quite similar in relation to the achievable minimum process times. The thermal efficiency of the known firing apparatus is, as a result, less than 25%.

On the basis of reaction-kinetic considerations, only a few minutes are necessary for the actual firing of ceramic pastes. The estimated values are between 10 and 20 minutes. The residence period of the parts at a high temperature level which exceeds the necessary firing time leads, on the one hand, to uncontrolled and undesirable crystal growth, and also to deformations as a result of the dead-weight load. On the other hand, the heating-up from room temperature to firing temperature and subsequent cooling to room temperature because of the thermal shock it involves, and also the numerous transfer steps between the heat cycles lead to a substantial wear of the kiln furniture. A large stock of kiln furniture is therefore necessary which may certainly amount to several thousand firing plates per firing apparatus. A large buffer of parts is furthermore necessary not only in, but also upstream of the firing apparatus. Finally, a total process time of more than 24 hours is a basic difficulty for quality control since the effect of measures taken can only be checked after this period of time.

It is here that the invention seeks to provide a remedy. As it is defined in the claims, the invention achieves the object by a process wherein the green moldings are placed on kiln furniture which has at least a temperature corresponding to the decomposition temperature of the plasticizers the kiln furniture and the green moldings are heated within 5 to 60 minutes to firing temperature and kept for 5 to 60 minutes at this temperature, the kiln furniture and the fired moldings are then cooled within 5 to 60 minutes to the original temperature and the moldings are removed from the kiln furniture at this temperature.

An apparatus for carrying out the process comprises a rotatably arranged circular kiln bed with a hood having heating devices. On the kiln bed there is arranged kiln furniture and the hood has an opening for loading and unloading the kiln furniture and is provided with walls which engage laterally over the kiln bed. The kiln bed and the hood may be arranged on a common bearing pillar and the hood may be arranged in an axially displaceable manner thereon.

The advantages achieved by the invention are essentially to be perceived in the fact that the heating cycle, i.e. the times between loading and unloading the firing apparatus, is less than three hours. Wear of the kiln furniture is reduced since it no longer has to be cooled to room temperature but only to temperatures above the structural transformation temperature limits, at most, however, only to the decomposition temperature of the plasticizers. The quality control for the fired parts is improved.

Figure 2:
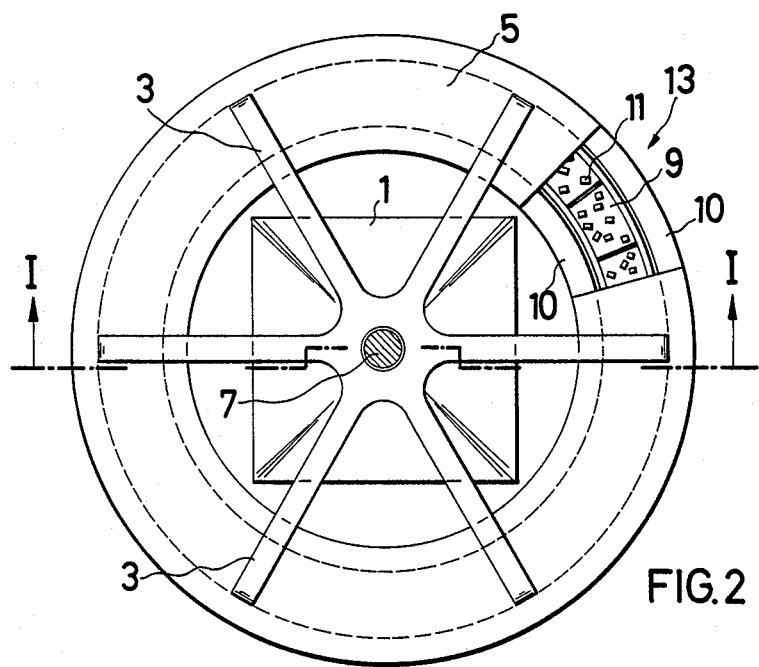

In the following invention is explained in more detail on the basis of a diagrammatic representation of the apparatus for firing the moldings, which is to be considered only as an exemplary embodiment. Here FIG. 1 shows the section I—I of FIG. 2 and
FIG. 2 shows the section II—II of FIG. 1.

The rotatably arranged, circular kiln bed 4 with hood 5 is arranged on a common bearing pillar 7. The bearing frame 2 for the kiln bed 4 rests on a base 1 and is driven by a motor 8. The kiln bed may consist of a thermally insulating material and have a groove in which the kiln furniture (firing plates) 9 is arranged. The kiln furniture 9 serves as a support for the moldings 11. The hood 5 is suspended on the bearing frame 3 which may be arranged moveably along the bearing pillar 7. The to-and-fro movement can be produced by means of a lifting device 6 which is attached to the bearing pillar 7. The hood, also of thermally insulating material, is provided with lateral walls 10, heating devices 12 and an opening 13 for loading and unloading the kiln furniture 9. Furthermore, there are arranged in the hood the usual measuring devices which are necessary for regulating the temperature and the kiln bed movement (not shown). The kiln temperature is regulated so that the kiln furniture does not go below the decomposition temperature of the plasticizers.

I claim:

1. A process for firing green moldings of ceramic pastes which contain plasticizers, comprising the steps of: placing the green moldings on kiln furniture which has at least a temperature corresponding to the decomposition temperature of the plasticizers; heating the kiln furniture and the green moldings within 5 to 60 minutes to firing temperature; keeping said kiln furniture and said moldings for 5 to 60 minutes at the firing temperature; cooling the kiln furniture and the fired moldings within 5 to 60 minutes to the original temperature; and removing the moldings from the kiln furniture at the cooled temperature.

2. A process for firing green moldings of ceramic pastes which contain plasticizers, comprising the steps of:
   loading the green moldings on heated kiln furniture on a rotatable circular kiln bed, the temperature of the heated kiln furniture corresponding at least to the decomposition temperature of the plasticizers;
   rotating the kiln bed during a first period while heating the kiln furniture and the green moldings to the firing temperature of the green moldings;
   maintaining the kiln furniture and the green moldings at the firing temperature during a second period;
   cooling the kiln furniture and the green moldings to the original temperature during a third period; and
   unloading the green moldings from the kiln.

3. A process according to claim 2, wherein said first period is from 5 to 60 minutes.

4. A process according to claim 3, wherein said third period is from 5 to 60 minutes.

5. A process according to claim 4, wherein said second period is from 5 to 60 minutes.

* * * * *